United States Patent
Bandi et al.

(10) Patent No.: US 12,425,115 B2
(45) Date of Patent: Sep. 23, 2025

(54) IoT DEVICE INTERFERENCE DETECTION

(71) Applicant: FORD GLOBAL TECHNOLOGIES, LLC, Dearborn, MI (US)

(72) Inventors: Krishna Bandi, Farmington Hills, MI (US); Sathyanarayana Chary Palakonda, Northville, MI (US); Ivan Vukovic, Birmingham, MI (US); Gopichandra Surnilla, West Bloomfield, MI (US); Joseph Zane, Birmingham, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 423 days.

(21) Appl. No.: 18/166,882

(22) Filed: Feb. 9, 2023

(65) Prior Publication Data

US 2024/0275506 A1    Aug. 15, 2024

(51) Int. Cl.
*H04B 17/345*    (2015.01)
*H04W 4/40*    (2018.01)
*H04W 64/00*    (2009.01)

(52) U.S. Cl.
CPC ........ *H04B 17/345* (2015.01); *H04W 64/006* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 10,582,459 B2 | 3/2020 | Gulati et al. | |
| 10,652,903 B2 | 5/2020 | Abdelmonem et al. | |
| 11,210,943 B2 | 12/2021 | Lei et al. | |
| 2021/0306822 A1* | 9/2021 | Ngai | H04W 4/029 |
| 2022/0085899 A1 | 3/2022 | Vukovic et al. | |
| 2022/0345980 A1* | 10/2022 | Kim | H04W 4/08 |
| 2023/0328489 A1* | 10/2023 | Ladhari | H04W 4/48 |
| | | | 370/338 |
| 2023/0408642 A1* | 12/2023 | Monteuuis | G01S 13/931 |

FOREIGN PATENT DOCUMENTS

| | | |
|---|---|---|
| WO | 2021141770 A1 | 7/2021 |
| WO | 2021226065 A1 | 11/2021 |
| WO | 2022218641 A1 | 10/2022 |

\* cited by examiner

*Primary Examiner* — Walter J Divito
(74) *Attorney, Agent, or Firm* — Joseph Zane; Brooks Kushman P.C.

(57) ABSTRACT

A vehicle identifies, from V2X messages received to a vehicle-to-everything (V2X) transceiver of a vehicle, message information from the received V2X messages indicative of locations of senders of the received V2X messages. The vehicle creates a virtual bounding box surrounding the vehicle based on a current location of the vehicle and a predefined size of the vehicle. The vehicle identifies whether any of the senders are located inside the vehicle using one or more factors, the factors including whether the locations of the senders of the received V2X messages are within the virtual bounding box. The configuration of the vehicle is updated based on whether any of the senders are located inside the vehicle.

24 Claims, 7 Drawing Sheets

IoT DEVICE INTERFERENCE DETECTION

TECHNICAL FIELD

Aspects of the disclosure generally relate to detecting and remediating cellular vehicle-to-everything (C-V2X) device interference caused by Internet-of-things (IoT) devices operating within a vehicle having a native C-V2X telematics control unit (TCU).

BACKGROUND

C-V2X allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure. In a vehicle telematics system, a TCU may be used for various remote-control services, such as over the air (OTA) software download, eCall, and turn-by-turn navigation.

SUMMARY

In one or more illustrative examples, a vehicle for detecting and remediating C-V2X device interference includes a vehicle-to-everything (V2X) transceiver configured to transmit and receive V2X messages; a memory maintaining a V2X congestion tracking application; and a processor programmed to execute the V2X congestion tracking application to perform operations including to identify message information from the received V2X messages indicative of locations of senders of the received V2X messages, create a virtual bounding box surrounding the vehicle based on a current location of the vehicle and a predefined size of the vehicle, identify whether any of the senders are located inside the vehicle using one or more factors, the factors including whether the locations of the senders of the received V2X messages are within the virtual bounding box, and update the configuration of the vehicle based on whether any of the senders are located inside the vehicle.

In one or more illustrative examples, a method for detecting and remediating C-V2X device interference, includes identifying, from V2X messages received to a V2X transceiver of a vehicle, message information from the received V2X messages indicative of locations of senders of the received V2X messages; creating a virtual bounding box surrounding the vehicle based on a current location of the vehicle and a predefined size of the vehicle; identifying whether any of the senders are located inside the vehicle using one or more factors, the factors including whether the locations of the senders of the received V2X messages are within the virtual bounding box; and updating the configuration of the vehicle based on whether any of the senders are located inside the vehicle.

In one or more illustrative examples, a non-transitory computer readable medium includes instructions of a V2X congestion tracking application that, when executed by a processor of a vehicle having a V2X transceiver configured to transmit and receive V2X messages, cause the vehicle to perform operations including to identify, from V2X messages received to a V2X transceiver of a vehicle, message information from the received V2X messages indicative of locations of senders of the received V2X messages; create a virtual bounding box surrounding the vehicle based on a current location of the vehicle and a predefined size of the vehicle; identify whether any of the senders are located inside the vehicle using one or more factors, the factors including whether the locations of the senders of the received V2X messages are within the virtual bounding box; and update the configuration of the vehicle based on whether any of the senders are located inside the vehicle.

DETAILED DESCRIPTION

Figure 1:
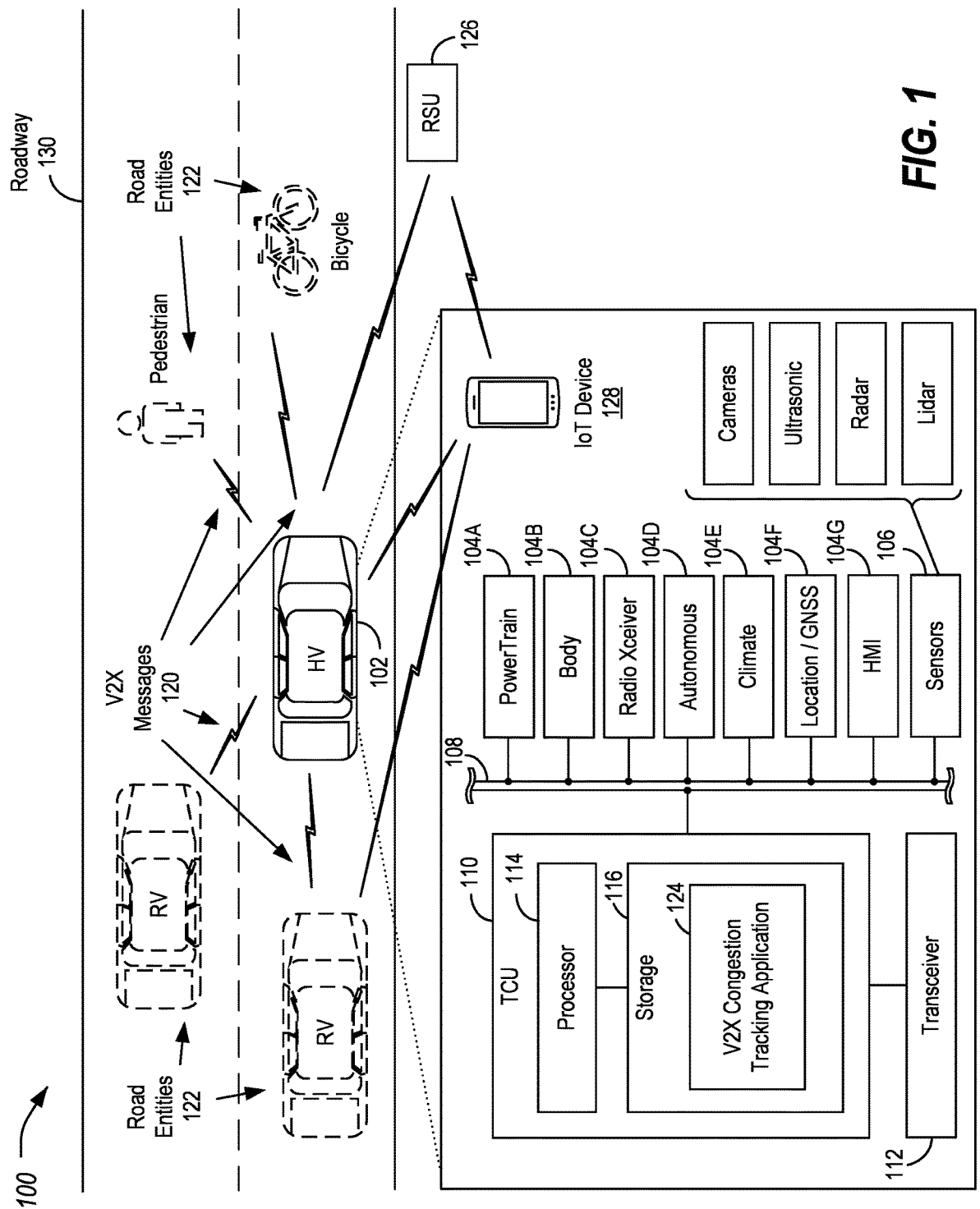
FIG. 1 illustrates an example system for the use of a bounding approach to detect and remediate C-V2X IoT device interference.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Many vehicles come equipped with TCUs having C-V2X capabilities. This allows the vehicles to perform connected tasks such as such as OTA software download, eCall, and turn-by-turn navigation. At the same time, IoT devices such as smartphones are also becoming C-V2X capable. IoT devices allow for connected services to be available in various use cases, such as for vehicles lacking native TCU functionality or to give pedestrians visibility to and from connected traffic participants.

In some situations, a user may bring an IoT device having C-V2X capabilities into a vehicle having native C-V2X functionality. However, operation of such devices within the vehicle may lead to issues with the operation of the vehicle's native C-V2X TCU. For instance, the brought-in devices may cause false alerts in driving assistance features that depend on messaging to the native C-V2X TCU. In an example, the IoT device may send V2X messages that cause false alerts in features such as forward driving alerts, intersection movement assist, left turn assist, blind spot alerts, lane change alerts, etc. The brought in devices may also cause false alerts in native vehicle-to-pedestrian (V2P) features such as vulnerable road user (VRU) alerts. The brought-in devices may also lead to an unnecessary increase in the channel busy ratio (CBR) due to the C-V2X network traffic being generated by the brought-in IoT devices operating within the vehicle. This may increase the possibility of packet collusions on the C-V2X transmission channels. In an attempt to remedy this, the TCU may adjust radio configuration parameters to increase various timeouts, potentially increasing the time between messages sent by the vehicle.

An enhanced approach to C-V2X congestion tracking utilizes a C-V2X congestion tracking application to compile information from intelligent transportation system (ITS) stack layers. This information may be used to identify whether the vehicle's native C-V2X TCU device is in condition for providing C-V2X transmissions and for enablement of C-V2X features for in-vehicle use. The C-V2X congestion tracking application may receive physical layer radio frequency (RF) data information of each V2X message received from the vehicle native C-V2X TCU for assessment of the RF characteristics of the received V2X messages. The C-V2X congestion tracking application may also receive data layer information with respect to received V2X messages. The application may decode the data layer elements of location (e.g., latitude, longitude, elevation) and positional accuracy (e.g., semi major axis accuracy, semi minor axis accuracy and semi major axis orientation) of the received V2X messages. This decoding of data layer elements may be done without the overhead of verifying credentials of the received V2X messages.

The C-V2X congestion tracking application may create a virtual dynamic bounding box of the vehicle based on the vehicle's native C-V2X TCU device location information and the vehicle's physical dimension characteristics (e.g., vehicle length, width, height). Using the message location and accuracy information and the vehicle location, the C-V2X congestion tracking application may perform a bounding box algorithm using the virtual dynamic bounding box to determine whether the received V2X messages from the C-V2X IoT devices fall inside or outside of the vehicle boundary area. The device monitoring may consider criteria such as time, speed, heading, vehicle sensors and distance, etc., using various threshold values for each.

Based on the virtual bounding box determination, the C-V2X congestion tracking application may provide an output indictive of what features or functions are enabled. This output may be provided to the V2X features on the vehicle, to the ITS stack, to the vehicle's native C-V2X TCU device, and/or to the vehicle infotainment human-machine interface (HMI). With respect to the ITS stack and the TCU, the output may indicate a recommendation to reconfigure to use fewer communications resources. With respect to the HMI, the output may indicate to display an indication that various features are disabled, and/or requesting the brought in devices to be powered off.

FIG. 1 illustrates an example system 100 for the use of a bounding approach to detect and remediate C-V2X IoT device interference. A vehicle 102 may include various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The vehicle 102 may be a vehicle driven by a driver with driver assistance features. In other examples, the vehicle may be a semi-autonomous vehicle (AV). These AV or driver assistance features may be supported via received V2X data. The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and pedestrians, which may be equipped with V2X technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., controllers 104A through 104G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104A may be configured to provide control of engine operating components (e.g., idle control components, fuel delivery components, emissions control components, etc.) and for monitoring status of such engine operating components (e.g., status of engine codes); a body controller 104B may be configured to manage various power control functions such as exterior lighting, interior lighting, keyless entry, remote start, and point of access status verification (e.g., closure status of the hood, doors and/or trunk of the vehicle 102); a radio transceiver controller 104C may be configured to communicate with key fobs, mobile devices, or other local vehicle 102 devices; an autonomous controller 104D may be configured to provide commands to control the powertrain, steering, or other aspects of the vehicle 102; a climate control management controller 104E may be configured to provide control of heating and cooling system components (e.g., compressor clutch, blower fan, temperature sensors, etc.); a location controller 104F may be configured to provide global navigation satellite system (GNSS) vehicle location information; and a HMI controller 104G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., advanced driver assistance system (ADAS) cameras), ultrasonic sensors, radar systems, and/or lidar systems.

A vehicle bus 108 may include various methods of communication available between the vehicle controllers 104, as well as between a TCU 110 and the vehicle controllers 104. As some non-limiting examples, the vehicle bus 108 may include one or more of a vehicle controller area network (CAN), an Ethernet network, and a media-oriented system transfer (MOST) network. Further aspects of the layout and number of vehicle buses 108 are discussed in further detail below.

The TCU 110 may include network hardware configured to facilitate communication between the vehicle controllers 104 and with other devices of the system 100. For example, the TCU 110 may include or otherwise access a transceiver 112 configured to facilitate communication with other vehicles 102 or with infrastructure. The transceiver 112 may include BLUETOOTH Low Energy (BLE) functionality, such as support for operation via LE1M and LE125K. The TCU 110 may be further configured to communicate over various other protocols, such as with a communication network over a network protocol (such as Uu). The TCU 110 may, additionally, be configured to communicate over a broadcast peer-to-peer protocol (such as PC5), to facilitate C-V2X communications with devices such as other vehicles 102. It should be noted that these protocols are merely examples, and different peer-to-peer and/or cellular technologies may be used.

The TCU 110 may include various types of computing apparatus in support of performance of the functions of the TCU 110 described herein. In an example, the TCU 110 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVASCRIPT, PERL, etc.

The TCU 110 may be configured to facilitate the collection of connected vehicle data and/or other vehicle information from the vehicle controllers 104 connected to the one or more vehicle buses 108. While a single vehicle bus 108 is illustrated, it should be noted that in many examples, multiple vehicle buses 108 are included, with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

The TCU 110 may be further configured to periodically transmit V2X messages 120 for reception by other vehicles 102. The position, dimension and heading of a vehicle 102 may be broadcast by the vehicle 102 in the in the V2X messages 120. In an example, the frequency of sending the V2X messages 120 may be on the order of every ten milliseconds. This frequency may be configurable based on the amount of V2X traffic. A V2X radio may be a relatively short-range communications unit (e.g., with a range on the order of one kilometer). In an example, the V2X radio may operate on Cellular V2X (e.g., C-V2X 3GPP). In another example, the V2X radio may operate on Institute of Electrical and Electronics Engineer (IEEE) 802.11p Dedicated Short Range Communication (DSRC). In one example, the V2X messages 120 may take the form of BSM messages as described in the Society of Automotive Engineer (SAE) standard document J2735. In another example, the V2X message 120 may take the form of SDSM messages as described in the SAE standard document J3224. In yet another example, the V2X messages 120 may take the form of PSM messages as described in the SAE standard document J2945.

The TCU 110 may be further configured to receive V2X messages 120 from other vehicles 102 or other road entities 122. In an example, the vehicle 102 may be referred to as a host vehicle (HV) and remote vehicles (RV) surrounding the HV may be in communication with the vehicle 102 as road entities 122. In another example, the HV may be in communication with other road entities 122, such as bicyclists, pedestrians, etc.

The V2X messages 120 may include collected information retrieved from the controllers 104 over the vehicle buses 108. In many examples, the collected information data may include information useful for autonomous vehicle operations or driver-assistance vehicle operations. The connected vehicle data information retrieved by the TCU 110 may include, as some non-limiting examples, latitude, longitude, time, heading angle, speed, lateral changes in speed, longitudinal changes in speed, yaw rate, throttle position, brake status, steering angle, headlight status, wiper status, external temperature, turn signal status, vehicle length, vehicle width, vehicle mass, and bumper height. The connected vehicle data information may also include, weather data (such as ambient temperature, ambient air pressure, etc.), traction control status, wiper status, or other vehicle status information (such as the status of exterior vehicle lights, type of vehicle, antilock brake system (ABS) system status, etc.).

The V2X messages 120 may also include information with respect to detected road entities 122. For instance, the V2X message 120 may indicate information such as location, size, and/or contour of detected road entities 122 along a roadway 130. The V2X message 120 may also indicate a type of the road entity 122 (e.g., pedestrian, car, truck, debris, etc.). For instance, a machine learning model may be used to classify the road entity 122 into a plurality of object classifications, and the V2X message 120 may indicate the most likely type that the road entity 122 is determined to be (or in other examples, probabilities that the road entity 122 is of various types of road entity 122).

In some examples the road entities 122 may additionally involve communication via one or more roadside units (RSUs) 126. The RSU 126 may be a device with processing capabilities and networking capabilities and may be designed to be placed in proximity of a roadway 130 for use in communicating with the vehicles 102. For instance, the RSU 126 may include hardware configured to communicate over the broadcast peer-to-peer protocol (such as PC5), to facilitate C-V2X communications with the vehicles 102. The RSU 126 may, accordingly, be able to communicate with multiple vehicles 102 along a specific roadway 130 or in a specific area. The RSU 126 may also have wired or wireless backhaul capability to allow for communication with other elements of a traffic control system, via e.g., Ethernet, or cellular connection to the cellular network infrastructure, for example over Uu interface.

In addition to vehicles 102 and other road entities 122, the system 100 may also include one or more IoT devices 128. These IoT devices 128 may include mobile phones or other mobile devices that are configured to support C-V2X functionality. For instance, the IoT devices 128 may include devices that serve to add connected features to non-connected vehicles 102.

The information included in the V2X messages 120 may be used by the vehicle 102 to provide various driving assistance features or other V2X features. For instance, the information in the V2X messages 120 may inform the vehicle 102 of the location of other vehicles 102 and/or traffic participants. Some features that take advantage of this information may include, for instance, forward driving alerts, intersection movement assist, left turn assist, blind spot alerts, lane change alerts, etc.

However, IoT devices 128 may cause false alerts in various driving assistance features of the native C-V2X TCU 110. For instance, V2X messages 120 sent by IoT devices 128 inside the vehicle 102 may cause false alerts in driving assistance features that depend on messaging to the native C-V2X TCU 110. This may be because those V2X messages 120 indicate locations in close proximity to the vehicle 102. In an example, IoT devices 128 may send V2X messages 120 that cause false alerts in features such as forward driving alerts, intersection movement assist, left turn assist, blind spot alerts, lane change alerts, etc. The brought in devices may also cause false alerts in native V2P features such as VRU alerts. The brought-in devices may also lead to an unnecessary increase in the CBR due to the C-V2X network traffic being generated by the brought-in IoT devices 128 operating within the vehicle 102.

A V2X congestion tracking application 124 may be utilized by the vehicle 102 to identify whether IoT devices 128 located within the vehicle 102 are sending V2X messages 120 that interfere with the V2X features. If such devices are identified, the V2X congestion tracking application 124 may perform various operations to alert the user of the condition and/or to remediate the condition. The operation of the V2X congestion tracking is discussed in detail herein with respect to FIGS. 2-5.

Figure 2:
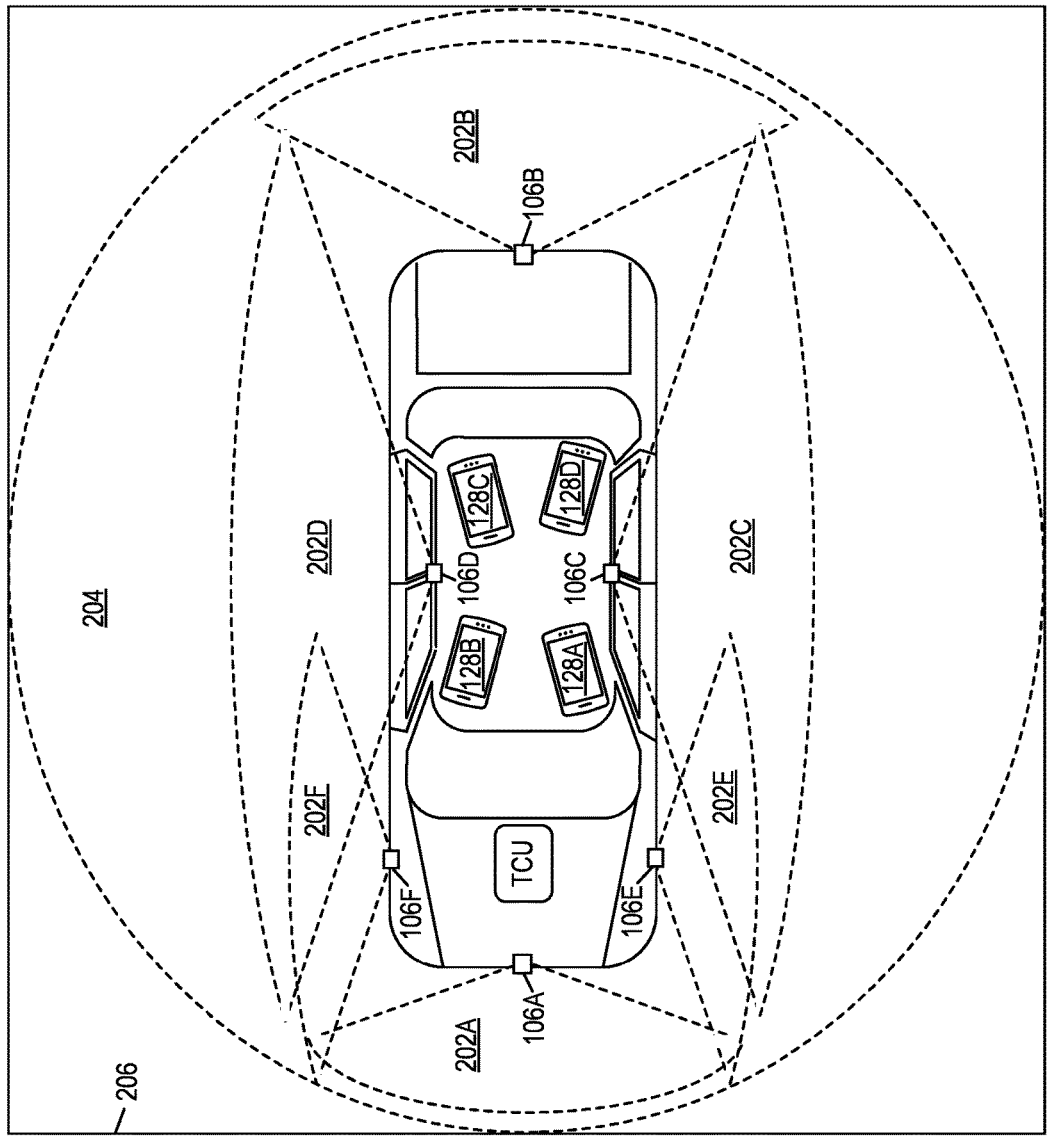
FIG. 2 illustrates an example of a connected vehicle illustrating sensor and C-V2X coverage area.

FIG. 2 illustrates an example 200 of a connected vehicle 102 illustrating sensor 106 and C-V2X coverage areas. As shown, the example vehicle 102 has six sensors 106, a front-facing sensor 106A having field-of-view 202A, a rear-facing sensor 106B having field-of-view 202B, a left-side sensor 106C having field-of-view 202C, a right-side sensor 106D having field-of-view 202D, a left-side mirror sensor 106E having field of field-of-view 202E, and a right-side mirror sensor 106F having field of field-of-view 202F. The sensors 106 may allow the vehicle 102 to identify various aspects of the environment surrounding the vehicle, such as the locations and speeds of objects in the vicinity of the vehicle 102.

Also shown, the TCU 110 of the vehicle 102 has a transmission envelope 204 surrounding the vehicle 102. The transmission envelope 204 may be defined based on a transmission distance from the vehicle 102. For instance, the transmission envelope 204 may be defined as a distance from a center of the vehicle 102. This may be, for example, a transmission distance in terms of wireless transmission speed through air as a medium. In addition, a bounding box 206 for the vehicle 102 is defined, here modeled as a square or a rectangle circumscribed around the transmission envelope 204. This bounding box 206 may be used as the area in which IoT devices 128 are to be considered for being within the vehicle 102. It should be noted that the fields-of-view 202A-F and the transmission envelope 204 are illustrative and are not to scale.

Figure 3:
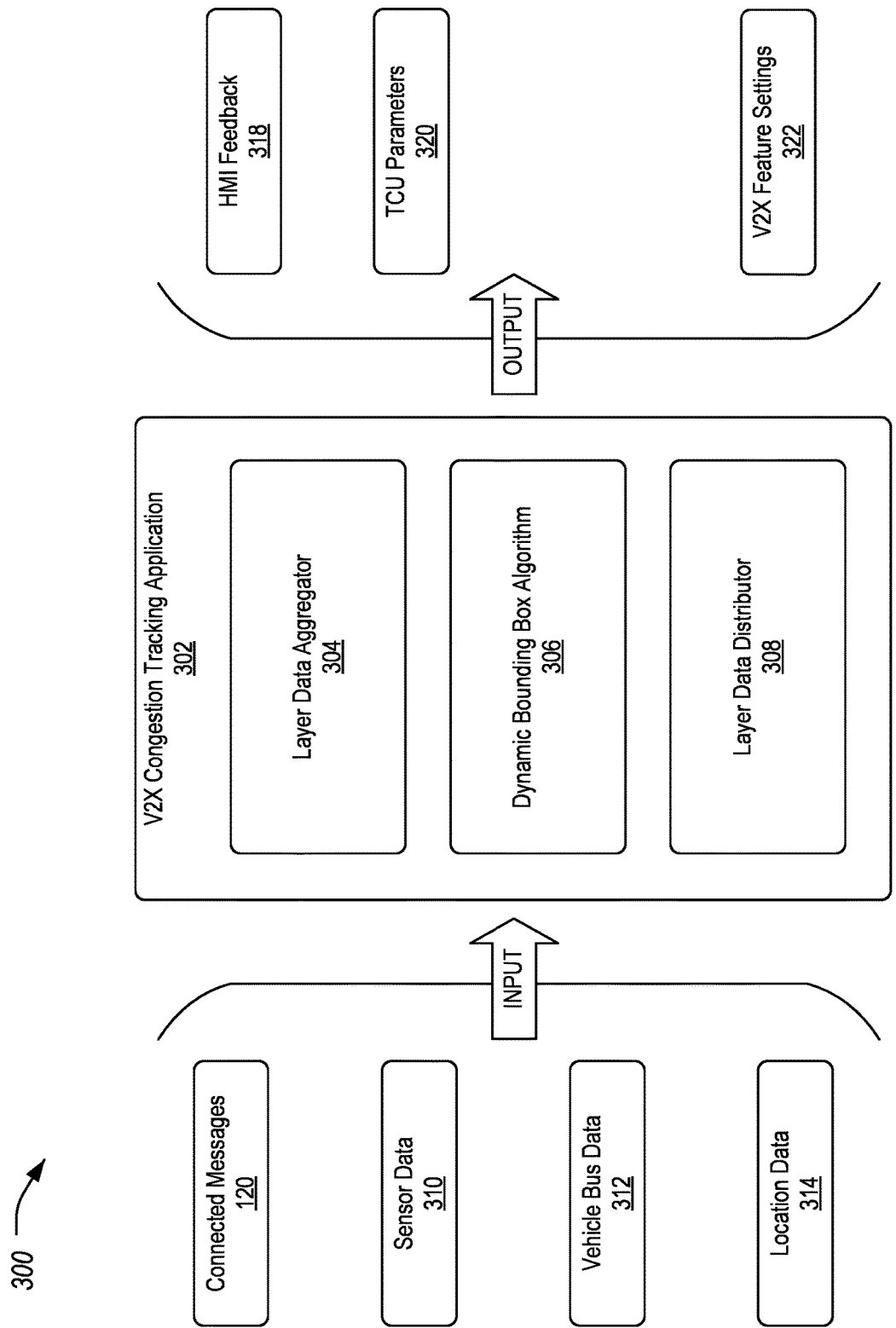
FIG. 3 illustrates aspects of the V2X congestion tracking application that is executed by the vehicle.

FIG. 3 illustrates aspects of the V2X congestion tracking application 124 that is executed by the vehicle 102. With reference to FIG. 3, and with continuing reference to FIG. 1, the V2X congestion tracking application 124 may be programmed to allow the vehicle 102 to perform various operations discussed in detail herein. The V2X congestion tracking application 124 may include a layer data aggregator 304 configured to receive various inputs from one or more components, a dynamic bounding box algorithm 306 configured to operate on the received inputs, and a layer data distributor 308 configured to provide outputs to one or more components. In an example, the V2X congestion tracking application 124 may be executed by one or more processors of the TCU 110.

The layer data aggregator 304 of the V2X congestion tracking application 124 may receive various elements of data as input. In an example, these inputs may include V2X messages 120 received by the TCU 110, sensor data 310 from the sensors 106, vehicle bus data 312 from a CAN or other data bus of the vehicle 102, and location data 314 from the location controller 104F. This information may be provided to the dynamic bounding box algorithm 306 for processing.

The layer data distributor 308 of the V2X congestion tracking application 124 may provide various outputs as well. In an example, these outputs may include HMI feedback 318 provided to the HMI controller 104G for use by occupants of the vehicle 102, TCU parameters 320 provided to the TCU 110 to adjust TCU 110 settings, as well as V2X feature settings 322 to adjust the functioning of the V2X alert features. These outputs may be received from the dynamic bounding box algorithm 306, as discussed in detail herein.

Figure 4A:
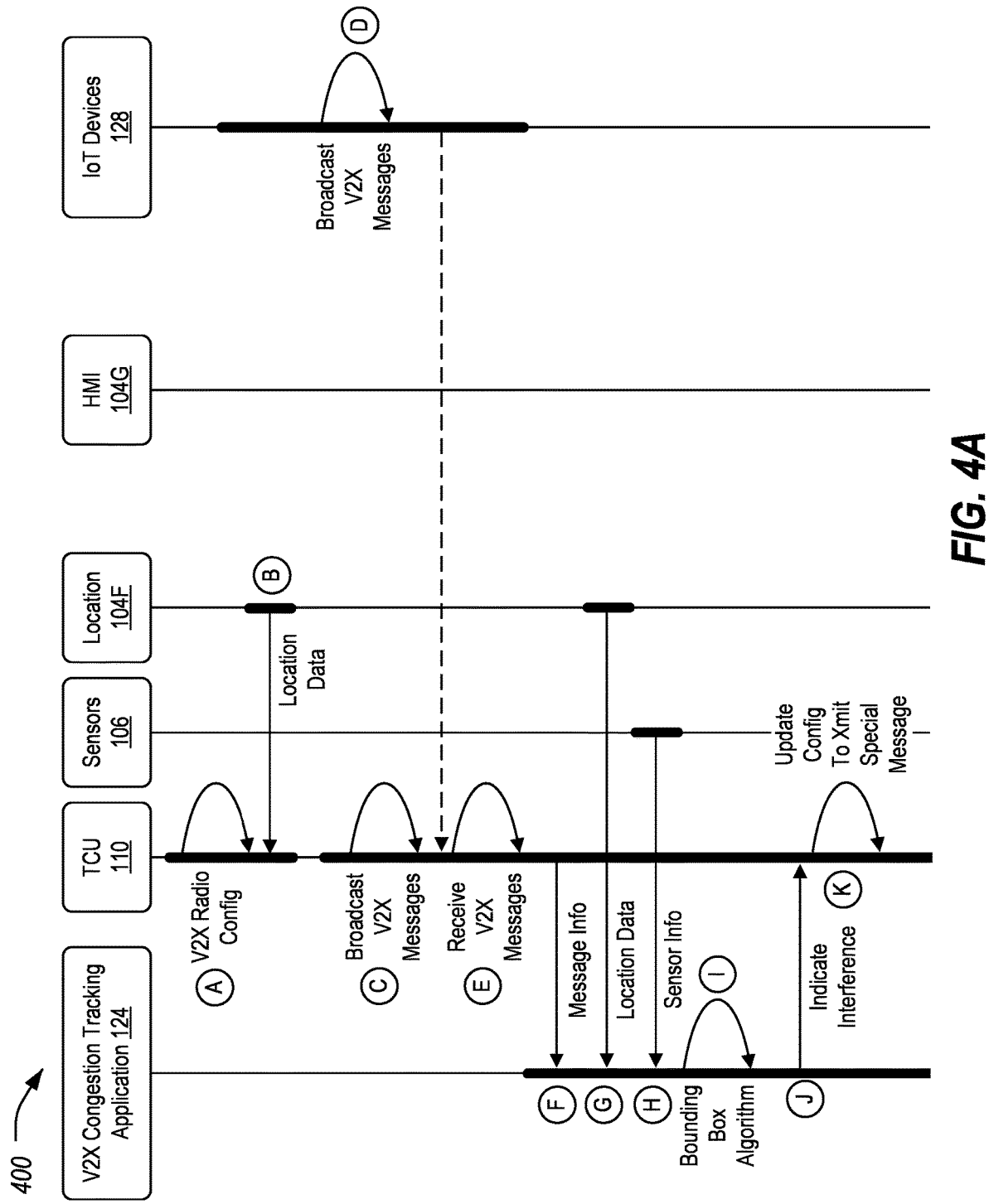
FIG. 4A illustrates an example of a first portion of a data flow diagram for the operation of the dynamic bounding box algorithm of the V2X congestion tracking application.
Figure 4B:
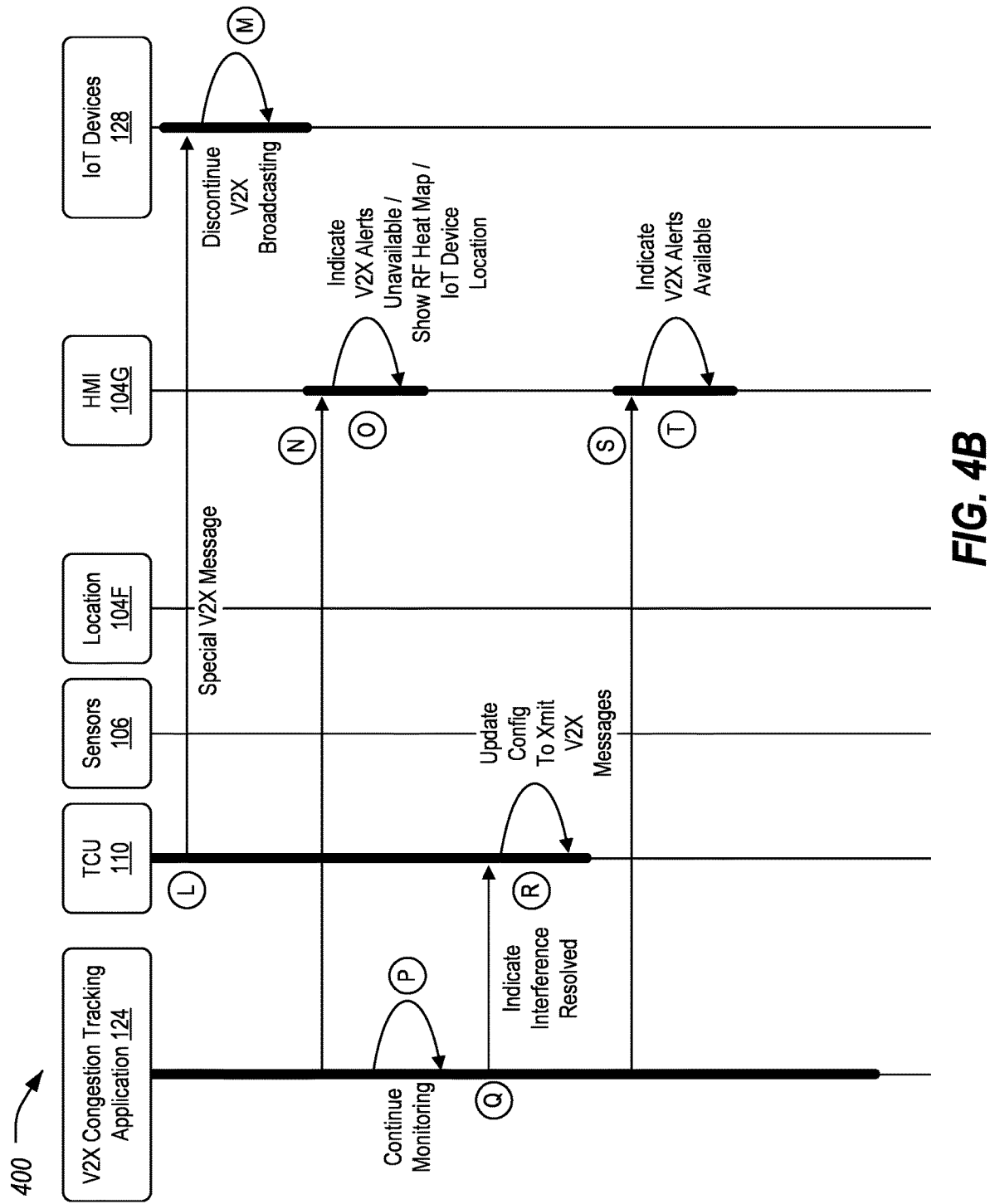
FIG. 4B illustrates an example of a second portion of the data flow diagram for the operation of the dynamic bounding box algorithm of the V2X congestion tracking application.

FIGS. 4A-4B collectively illustrate an example data flow diagram 400 for the operation of the dynamic bounding box algorithm 306 of the V2X congestion tracking application 124. In the example, the operation of the V2X congestion tracking application 124 is shown in the context of the system 100.

At index (A), the TCU 110 sets an initial radio configuration for V2X functionality. This configuration may include application of TCU parameters 320 such as timeouts between the TCU 110 sending V2X messages 120, as well as application of V2X feature settings 322 that indicate which V2X features are active for the vehicle 102. This initial configuration may be specified by settings of the vehicle 102. In many examples, the vehicle 102 may default to activation of V2X features, as well as for the sending of V2X messages 120 with timeouts consistent with a low CBR.

At index (B), the TCU 110 receives location data 314 from the location controller 104F. In an example, the location controller 104F may utilize GNSS to provide information to the TCU 110 indicative of the location (e.g., latitude, longitude, elevation) and positional accuracy (e.g., semi major axis accuracy, semi minor axis accuracy and semi major axis orientation) of the vehicle 102.

At index (C), the TCU 110 broadcasts V2X messages 120 in accordance with the V2X feature settings 322 and TCU parameters 320 set at index (A). These V2X messages 120 may indicate, for example, the position of the vehicle 102 based on the information received at index (B).

At index (D), the IoT devices 128 may also be broadcasting V2X messages 120 in accordance with their own settings. These V2X messages 120 may indicate the positions and/or other information about the IoT devices 128. One or more of the IoT devices 128 may be within the vehicle 102, which may be inside the bounding box 206. These IoT devices 128 may also include other IoT devices 128 which may be outside the vehicle 102 and therefore most likely outside the bounding box 206. While the broadcasting of V2X messages 120 from the IoT devices 128 is shown at index (D), it should be noted that these transmissions may be periodic and/or continuous from the IoT devices 128 that are configured and enabled to send V2X messages 120.

At index (E), the TCU 110 receives V2X messages 120. In an example, these V2X messages 120 may include messages from other vehicles 102 or road entities 122, as well as messages from the IoT devices 128 broadcast at index (D).

At index (F), the TCU 110 provides message information from the V2X messages 120 to the V2X congestion tracking application 124 for analysis. The V2X congestion tracking application 124 accordingly receives the message information. This message information may include, for example, physical layer information such as received signal strength indication (RSSI), reference signal received quality (RSRQ), reference signal received power (RSRP), and/or signal to interference plus noise ratio (SINR). This message information may also include data layer information the fields of the receives V2X messages 120, such as fields of BSMs, PSMs, etc., which may specify location information and/or positional accuracy information with respect to the received V2X messages 120. Although the V2X congestion tracking application 124 may not verify credentials of the received V2X messages 120 to conserve resources, the V2X congestion tracking application 124 may decode the location (e.g., latitude, longitude, elevation) and positional accuracy (e.g., semi major axis accuracy, semi minor axis accuracy and semi major axis orientation) of the received V2X messages 120.

At index (G), the V2X congestion tracking application 124 also receives location data 314 from the location controller 104F. In an example, the location controller 104F may utilize GNSS to provide information to the TCU 110 indicative of the location (e.g., latitude, longitude, elevation) and positional accuracy (e.g., semi major axis accuracy, semi minor axis accuracy and semi major axis orientation) of the vehicle 102.

At index (H), the V2X congestion tracking application 124 also receives sensor data 310 from the sensors 106. This sensor data 310 may include, for example, information indicative of the location or other aspects of the objects in the environment surrounding the vehicle 102.

At index (I), the V2X congestion tracking application 124 utilizes the dynamic bounding box algorithm 306 to determine whether any of the received V2X messages 120 are from IoT devices 128 located within the vehicle 102. For instance, application may also create a virtual dynamic bounding box 206 of the vehicle 102, based on the native C-V2X TCU 110 device location information and the physical dimension characteristics of the vehicle 102 (e.g., length, width, height). Using the message location and accuracy information and the device location and accuracy information, the application may use the bounding box 206 to determine whether the received V2X messages 120 from the C-V2X IoT devices 128 fall inside or outside of the vehicle 102 boundary area. Further aspects of the processing of the dynamic bounding box algorithm 306 are discussed with respect to the process 500 below.

Based on the determination made using the bounding box 206 by the V2X congestion tracking application 124, the V2X congestion tracking application 124 may provide an output indictive of what V2X features or functions should be enabled or disabled. This output may be provided to the V2X features on the vehicle 102, to the ITS stack, to the native C-V2X TCU 110 device, and/or to the vehicle 102 infotainment HMI.

At index (J), with respect to the ITS stack and the TCU 110, the output may indicate that interference was detected. In some examples, the output may include TCU parameters 320 to adjust TCU 110 settings, as well as V2X feature settings 322 to adjust the functioning to disable the V2X messages 120 and instead broadcast a special V2X message 120 that causes the recipient device to turn off its own V2X messages 120. These TCU parameters 320 and V2X feature settings 322 may be used to update the configuration of the TCU 110 at index (K).

Referring to FIG. 4B, at index (L) the special V2X messages 120 broadcast from the TCUs 110 may request that the IoT devices 128 identified as within the bounding box 206 discontinue transmission of V2X messages 120. For example, the special V2X messages 120 may include identifiers of the sending IoT devices 128 to be disabled. The sending of this special message by the vehicle 102 may allow for the automatic disablement of the IoT devices 128 that are causing interference, as shown at index (M).

With respect to the HMI, the output may indicate to display an indication that various features are disabled, and/or requesting IoT devices 128 to be powered off. This update may be provided at index (N) from the V2X congestion tracking application 124 to the HMI controller 104G.

At index (O), HMI feedback 318 indicating the alert status with respect to any disabled V2X alert features may be provided to the user via the HMI controller 104G. The HMI feedback 318 may also include information that may be used by the HMI controller 104G to display an RF heat map of the vehicle 102 and/or the identified locations of the IoT devices 128 that are inside the bounding box 206.

At index (P), the V2X congestion tracking application 124 continues to utilize the dynamic bounding box algorithm 306 to determine whether any of the received V2X messages 120 are from IoT devices 128 located within the vehicle 102. For instance, the V2X congestion tracking application 124 may generally continue the monitoring discussed at index (I), e.g., continuously or periodically.

For instance, the monitoring may be performed to identify any new IoT devices 128 have be found that are within the bounding box 206. If so, operations may be performed consistent with indexes (J)-(O) discussed above.

Additionally, the monitoring may be continued to allow the V2X congestion tracking application 124 to identify whether any IoT devices 128 that were requested to discontinue broadcasting have done so (e.g., as shown at indexes (L) and (M)). In such an example, and responsive to the interference being resolved, at index (Q) with respect to the ITS stack and the TCU 110 a further output may indicate that the interference was resolved. For instance, the output may include TCU parameters 320 to adjust TCU 110 settings, as well as V2X feature settings 322 to adjust the functioning to reenable the V2X messages and discontinue sending the V2X special message. These TCU parameters 320 and V2X feature settings 322 may be used to update the configuration of the TCU 110 at index (M). Also responsive to the interference being resolved, at index (S), HMI feedback 318 indicating the alert status with respect to reenabled V2X alert features may be provided to the user via the HMI controller 104G. This may be shown to the user at index (T).

Figure 5:
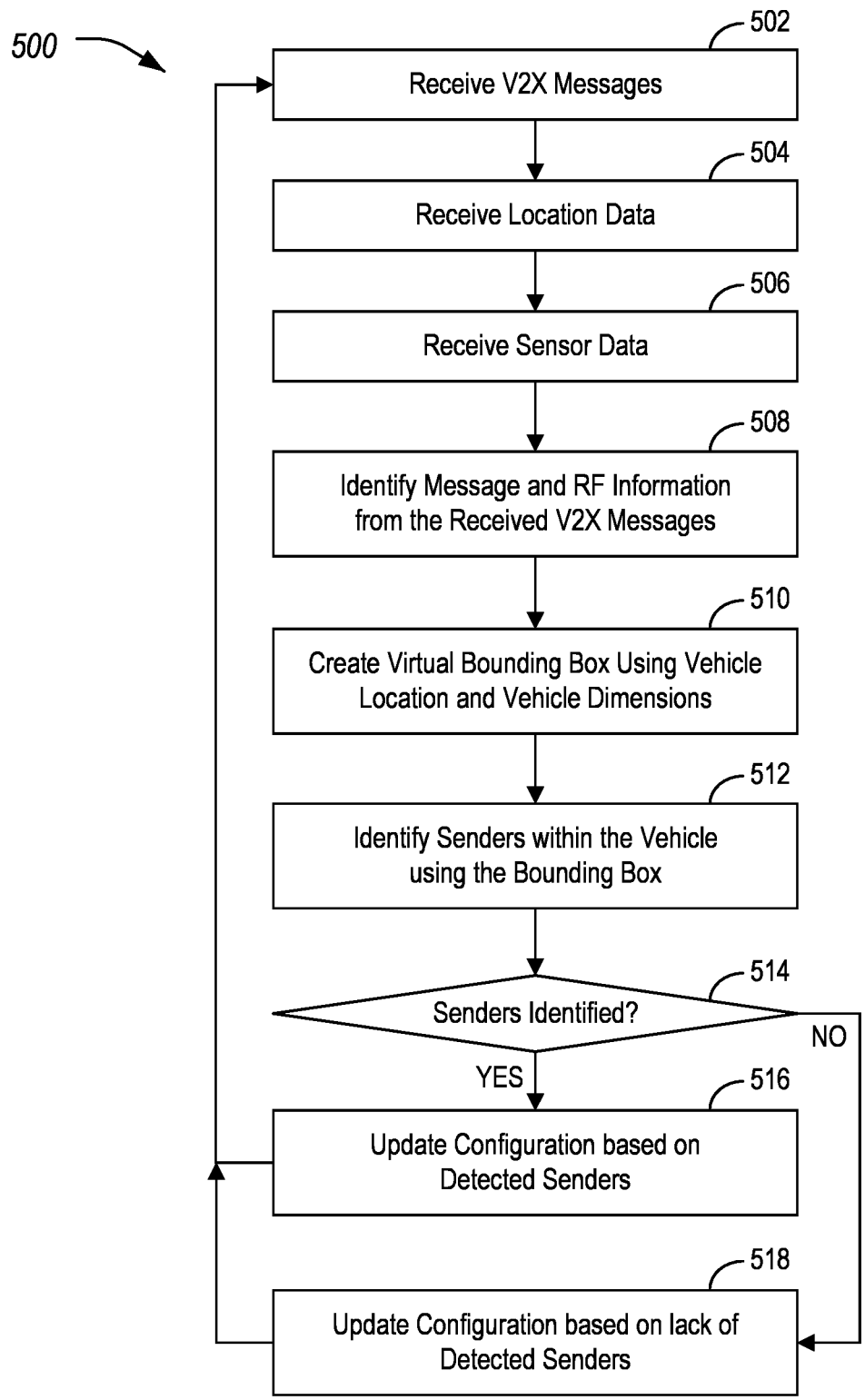
FIG. 5 illustrates a process describing details of the dynamic bounding box algorithm of the V2X congestion tracking application.

FIG. 5 illustrates a process 500 describing details of the dynamic bounding box algorithm 306 of the V2X congestion tracking application 124. In an example, the process 500 may be performed by the V2X congestion tracking application 124 executed by the TCU 110 in the context of the system 100. While the process 500 is discussed in terms of the TCU 110, it should be noted that in other examples, one or more aspects of the operations of the V2X congestion tracking application 124 may be performed by other controllers 104 of the vehicle 102.

At operation 502, the V2X congestion tracking application 124 receives V2X messages 120. For example, the TCU 110 may include or otherwise access a transceiver 112 configured to facilitate communication with other vehicles 102 or with infrastructure. The TCU 110 may utilize the transceiver 112 to receive V2X messages 120 from other vehicles 102 or other road entities 122, and/or from IoT devices 128. The V2X messages 120 may include BSMs, PSMs, SDSMs, or other forms of V2X communications.

At operation 504, the V2X congestion tracking application 124 receives location data 314. In an example, the location controller 104F may utilize GNSS or other location technologies to generate location data 314 indicative of the current location of the vehicle 102. The information may also indicate the positional accuracy of the vehicle 102. This location data 314 may be received to the TCU 110 by the V2X congestion tracking application 124, e.g., via the vehicle bus 108.

At operation 506, the V2X congestion tracking application 124 receives sensor data 310. This sensor data 310 may include, for example, information indicative of the location or other aspects of the positioning or surroundings of the vehicle 102.

At operation 508, the V2X congestion tracking application 124 identifies message information from the received V2X messages 120. The message information may include data layer information included in fields of the V2X messages 120, such as latitude, longitude, and elevation. The data layer information may also include positional accuracy information, where the positional accuracy information including semi major axis accuracy, semi minor axis accuracy and semi major axis orientation. The message information may also include physical layer information including one or more of: RSSI, RSRQ, RSRP, and/or SINR, and the identification of whether any of the senders are located inside the vehicle 102 includes consideration of both the physical layer information and the data layer information.

At operation 510, the V2X congestion tracking application 124 creates a virtual bounding box 206 using the location data 314 and the vehicle 102 dimensions. For instance, the V2X congestion tracking application 124 may create a virtual dynamic bounding box 206 of the vehicle 102, based on the native C-V2X TCU 110 device location information and the physical dimension characteristics of the vehicle 102 (e.g., length, width, height). In some examples, the bounding box 206 may be adjusted in direction to correspond to the heading direction of the vehicle 102, e.g., as determined from the location data 314 and/or the sensor data 310.

At operation 512, the V2X congestion tracking application 124 identifies whether any senders of V2X messages 120 are located within the vehicle 102. Using the message location and accuracy information and the device location and accuracy information, the V2X congestion tracking application 124 may use the bounding box 206 to determine whether the received V2X messages 120 fall inside or outside of the vehicle 102 boundary area.

This determination may include a fusion of factors. As a possibility, the distance between the IoT device 128 and the vehicle 102 may be computed and compared to the bounding box 206. If the IoT device 128 is within the bounding box 206, then the IoT device 128 may be more likely to be within the vehicle 102. For example, the V2X congestion tracking application 124 may consider whether the senders are located inside the vehicle 102 based on the RSSI or other physical layer information. Using that example, if the RSSI exceeds a predefine threshold, then the sender may be considered to be within the vehicle 102. In another example, the V2X congestion tracking application 124 may consider whether the senders are located within the vehicle 102 based on the whether location information in the data layer information indicates presence of the sender within the vehicle 102. Various thresholds may be used for each factor to determine whether the sender is within the vehicle 102.

The device monitoring also may consider criteria such as time, speed, heading, sensor data 310, and distance, etc., using various threshold values for each. In an example, the speed and/or heading of the vehicle 102 based on the vehicle bus data 312 may be compared to the speed and/or heading determined from the received V2X messages 120 from an IoT device 128 to identify whether the IoT device 128 is traveling with consistent speed and heading to the vehicle 102. If so, then the IoT device 128 may be more likely to be within the vehicle 102.

In yet another example, the objects detected in the sensor data 310 may be mapped to the V2X messages 120 to attempt to correlate the objects to the sensed information. If the V2X messages 120 correlate to a vehicle 102 or other road entity 122 that is sensed as being outside the vehicle 102, then those V2X messages 120 may be considered to be external to the vehicle 102.

The V2X congestion tracking application 124 may use the outcomes in combination to increase the accuracy of the determination of which V2X messages 120 originate within the vehicle 102. In one example, the V2X congestion tracking application 124 may consider the sender to be within the vehicle 102 only if a plurality of factors indicate that the sender is within the vehicle 102. In another example, the V2X congestion tracking application 124 may consider the sender to be within the vehicle 102 if any factor indicates that the sender is within the vehicle 102.

At operation 514, the V2X congestion tracking application 124 determines whether any such senders were identified at operation 512. If so, control proceeds to operation 516. If not, control proceeds to operation 518.

At operation 516, the V2X congestion tracking application 124 updates the configuration of the vehicle 102 based on the presence of senders within the vehicle 102. In an example, responsive to determining that there are senders located inside the vehicle 102, the V2X congestion tracking application 124 may send a notification for display on the HMI of the vehicle 102 as HMI feedback 318, the HMI feedback 318 indicating one or more of: a request to turn off V2X messaging from the senders located inside the vehicle 102, or an indication that V2X features of the vehicle 102 are being disabled due to the senders located inside the vehicle 102. In another example, responsive to determining that there are senders located inside the vehicle 102, the V2X congestion tracking application 124 may disable the transmission of V2X messages 120 and/or increase a period of time between transmission of V2X messages 120 from the V2X transceiver 112. The V2X congestion tracking application 124 may also cause the V2X transceiver 112 to send V2X special messages that cause recipient IoT devices 128 to turn off their sending of V2X messages 120. For instance, the V2X congestion tracking application 124 may send updated TCU parameters 320 to the TCU 110 to update the operation of the TCU 110. After operation 516, control returns to operation 502.

At operation 518, the V2X congestion tracking application 124 updates the configuration of the vehicle 102 based on the lack of presence of senders within the vehicle 102. In an example, responsive to determining that there are no senders located inside the vehicle 102 and that V2X features were disabled, the V2X congestion tracking application 124 may send a notification for display on the HMI of the vehicle 102 as HMI feedback 318, the HMI feedback 318 indicating indicating that the V2X features of the vehicle 102 are no longer being disabled. In another example, responsive to determining that there are senders located inside the vehicle 102, the V2X congestion tracking application 124 may restart the sending of or decrease the period of time between transmission of V2X messages 120 from the V2X transceiver 112. The V2X congestion tracking application 124 may also cause the V2X transceiver 112 to discontinue sending V2X special messages. For instance, the V2X congestion tracking application 124 may send updated TCU parameters 320 to the TCU 110 to update the operation of the TCU 110. After operation 518, control returns to operation 502.

Figure 6:
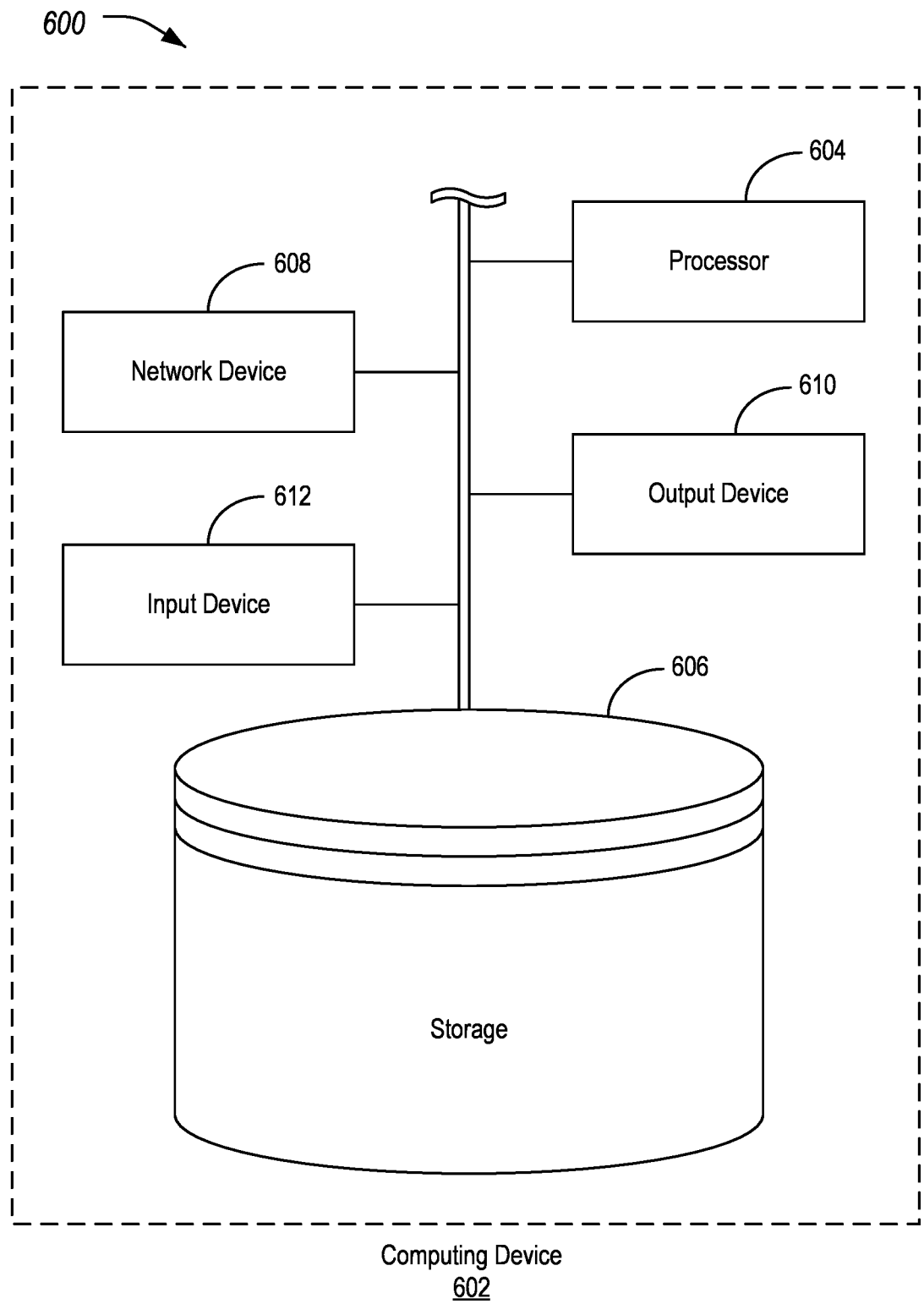
FIG. 6 illustrates an example of a computing device for use in the bounding approach to detect and remediate C-V2X IoT device interference.

FIG. 6 illustrates an example 600 of a computing device 602 for use in the bounding approach to detect and remediate C-V2X IoT device 128 interference. Referring to FIG. 6, and with reference to FIGS. 1-5, the TCUs 110, transceivers 112, road entities 122, RSUs 126, and IoT devices 128 may be examples of such computing devices 602. As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices 612 that receive human interface inputs may include keyboards, mice, trackballs, touchscreens, voice input microphones, graphics tablets, and the like.

The network devices 608 may each include any of various devices that enable the TCUs 110, transceivers 112, road entities 122, RSUs 126, and IoT devices 128 to send and/or receive data from external devices over networks. Examples of suitable network devices 608 include an Ethernet interface, a Wi-Fi transceiver, a cellular transceiver, or a BLUETOOTH or BLE transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:
1. A vehicle for detecting and remediating cellular vehicle-to-everything (C-V2X) device interference, comprising:
a vehicle-to-everything (V2X) transceiver configured to transmit and receive V2X messages;

a memory maintaining a V2X congestion tracking application; and a processor programmed to execute the V2X congestion tracking application to perform operations including to identify message information from the received V2X messages indicative of locations of senders of the received V2X messages, create a virtual bounding box surrounding the vehicle based on a current location of the vehicle and a predefined size of the vehicle, identify whether any of the senders are located inside the vehicle using one or more factors, the factors including whether the locations of the senders of the received V2X messages are within the virtual bounding box, and update the configuration of the vehicle based on whether any of the senders are located inside the vehicle.

2. The vehicle of claim 1, wherein the message information from the received V2X messages includes data layer information included in fields of the V2X messages, the data layer information including latitude, longitude, and elevation.

3. The vehicle of claim 2, wherein the data layer information further includes positional accuracy information, the positional accuracy information including semi major axis accuracy, semi minor axis accuracy and semi major axis orientation.

4. The vehicle of claim 2, wherein the message information includes physical layer information including one or more of: received signal strength indication (RSSI), reference signal received quality (RSRQ), reference signal received power (RSRP), and/or signal to interference plus noise ratio (SINR), and the identification of whether any of the senders are located inside the vehicle includes consideration of both the physical layer information and the data layer information.

5. The vehicle of claim 1, wherein to update the configuration of the vehicle includes:

responsive to determining that there are senders located inside the vehicle, to send a notification for display on a human-machine interface (HMI) of the vehicle, the notification indicating one or more of: a request to turn off V2X messaging from the senders located inside the vehicle, an indication that V2X features of the vehicle are being disabled due to the senders located inside the vehicle, or information that to cause the HMI to display an radio frequency (RF) heat map of the vehicle and/or identified locations of the senders that are inside the bounding box.

6. The vehicle of claim 5, wherein to update the configuration of the vehicle includes:

responsive to determining that there are no senders located inside the vehicle and that V2X features were disabled, sending a second notification for display on the HMI of the vehicle, the second notification indicating that the V2X features of the vehicle are no longer being disabled.

7. The vehicle of claim 1, wherein to update the configuration of the vehicle includes:

responsive to determining that there are senders located inside the vehicle, discontinue sending of V2X messages or increase a period of time between transmission of V2X messages from the V2X transceiver; and responsive to determining that there are no senders located inside the vehicle, reenable sending of the V2X messages or decrease the period of time between transmission of V2X messages from the V2X transceiver.

8. The vehicle of claim 7, wherein to update the configuration of the vehicle includes:

responsive to determining that there are senders located inside the vehicle, send special V2X messages configured to cause recipient senders located inside the vehicle to discontinue sending V2X messages; and responsive to determining that there are no longer senders located inside the vehicle, discontinue sending the special V2X messages.

9. A method for detecting and remediating cellular vehicle-to-everything (C-V2X) device interference, comprising:

identifying, from V2X messages received to a vehicle-to-everything (V2X) transceiver of a vehicle, message information from the received V2X messages indicative of locations of senders of the received V2X messages;

creating a virtual bounding box surrounding the vehicle based on a current location of the vehicle and a predefined size of the vehicle;

identifying whether any of the senders are located inside the vehicle using one or more factors, the factors including whether the locations of the senders of the received V2X messages are within the virtual bounding box; and updating the configuration of the vehicle based on whether any of the senders are located inside the vehicle.

10. The method of claim 9, wherein the message information from the received V2X messages includes data layer information included in fields of the V2X messages, the data layer information including latitude, longitude, and elevation.

11. The method of claim 10, wherein the data layer information further includes positional accuracy information, the positional accuracy information including semi major axis accuracy, semi minor axis accuracy and semi major axis orientation.

12. The method of claim 10, wherein the message information includes physical layer information including one or more of: received signal strength indication (RSSI), reference signal received quality (RSRQ), reference signal received power (RSRP), and/or signal to interference plus noise ratio (SINR), and the identification of whether any of the senders are located inside the vehicle includes consideration of both the physical layer information and the data layer information.

13. The method of claim 9, wherein updating the configuration of the vehicle includes:

responsive to determining that there are senders located inside the vehicle, sending a notification for display on a human-machine interface (HMI) of the vehicle, the notification indicating one or more of: a request to turn off V2X messaging from the senders located inside the vehicle, an indication that V2X features of the vehicle are being disabled due to the senders located inside the vehicle, or information that to cause the HMI to display an radio frequency (RF) heat map of the vehicle and/or identified locations of the senders that are inside the bounding box.

14. The method of claim 13, wherein updating the configuration of the vehicle includes:

responsive to determining that there are no senders located inside the vehicle and that V2X features were disabled, sending a second notification for display on the HMI of the vehicle, the second notification indicating that the V2X features of the vehicle are no longer being disabled.

15. The method of claim 9, wherein updating the configuration of the vehicle includes:
responsive to determining that there are senders located inside the vehicle, discontinuing sending of V2X messages or increase a period of time between transmission of V2X messages from the V2X transceiver; and
responsive to determining that there are no senders located inside the vehicle, reenabling sending of the V2X messages or decrease the period of time between transmission of V2X messages from the V2X transceiver.

16. The method of claim 15, wherein updating the configuration of the vehicle includes:
responsive to determining that there are senders located inside the vehicle, sending special V2X messages configured to cause recipient senders located inside the vehicle to discontinue sending V2X messages; and
responsive to determining that there are no longer senders located inside the vehicle, discontinuing sending the special V2X messages.

17. A non-transitory computer readable medium comprising instructions of a V2X congestion tracking application that, when executed by a processor of a vehicle having a vehicle-to-everything (V2X) transceiver configured to transmit and receive V2X messages, cause the vehicle to perform operations including to:
identify, from V2X messages received to a vehicle-to-everything (V2X) transceiver of a vehicle, message information from the received V2X messages indicative of locations of senders of the received V2X messages;
create a virtual bounding box surrounding the vehicle based on a current location of the vehicle and a predefined size of the vehicle;
identify whether any of the senders are located inside the vehicle using one or more factors, the factors including whether the locations of the senders of the received V2X messages are within the virtual bounding box; and
update the configuration of the vehicle based on whether any of the senders are located inside the vehicle.

18. The medium of claim 17, wherein the message information from the received V2X messages includes data layer information included in fields of the V2X messages, the data layer information including latitude, longitude, and elevation.

19. The medium of claim 18, wherein the data layer information further includes positional accuracy information, the positional accuracy information including semi major axis accuracy, semi minor axis accuracy and semi major axis orientation.

20. The medium of claim 18, wherein the message information includes physical layer information including one or more of: received signal strength indication (RSSI), reference signal received quality (RSRQ), reference signal received power (RSRP), and/or signal to interference plus noise ratio (SINR), and the identification of whether any of the senders are located inside the vehicle includes consideration of both the physical layer information and the data layer information.

21. The medium of claim 17, wherein to update the configuration of the vehicle includes:
responsive to determining that there are senders located inside the vehicle, to send a notification for display on a human-machine interface (HMI) of the vehicle, the notification indicating one or more of: a request to turn off V2X messaging from the senders located inside the vehicle, an indication that V2X features of the vehicle are being disabled due to the senders located inside the vehicle, or information that to cause the HMI to display an radio frequency (RF) heat map of the vehicle and/or identified locations of the senders that are inside the bounding box.

22. The medium of claim 21, wherein to update the configuration of the vehicle includes:
responsive to determining that there are no senders located inside the vehicle and that V2X features were disabled, sending a second notification for display on the HMI of the vehicle, the second notification indicating that the V2X features of the vehicle are no longer being disabled.

23. The medium of claim 17, wherein to update the configuration of the vehicle includes:
responsive to determining that there are senders located inside the vehicle, discontinue sending of V2X messages or increase a period of time between transmission of V2X messages from the V2X transceiver; and
responsive to determining that there are no senders located inside the vehicle, reenable sending of the V2X messages or decrease the period of time between transmission of V2X messages from the V2X transceiver.

24. The medium of claim 23, wherein to update the configuration of the vehicle includes:
responsive to determining that there are senders located inside the vehicle, send special V2X messages configured to cause recipient senders located inside the vehicle to discontinue sending V2X messages; and
responsive to determining that there are no longer senders located inside the vehicle, discontinue sending the special V2X messages.

* * * * *